US010174837B2

(12) United States Patent
Funyak et al.

(10) Patent No.: US 10,174,837 B2
(45) Date of Patent: *Jan. 8, 2019

(54) DIRECT CLUTCH SLIP CONTROL

(71) Applicant: Infineon Technolgies AG, Neubiberg (DE)

(72) Inventors: Joseph Funyak, Rochester Hills, MI (US); Edward Lezon, Brighton, MI (US); Michael D. Hausmann, Gleisdorf (AT); Martin D. Graefling, Graz (AT)

(73) Assignee: Infineon Technologies AG, Neubiberg (DE)

(*) Notice: Subject to any disclaimer, the term of this patent is extended or adjusted under 35 U.S.C. 154(b) by 338 days.

This patent is subject to a terminal disclaimer.

(21) Appl. No.: 14/754,327

(22) Filed: Jun. 29, 2015

(65) Prior Publication Data

US 2015/0300486 A1 Oct. 22, 2015

Related U.S. Application Data

(63) Continuation of application No. 13/909,679, filed on Jun. 4, 2013, now Pat. No. 9,097,345.

(51) Int. Cl.
*F16H 61/686* (2006.01)
*F16H 61/68* (2006.01)
*B60W 10/02* (2006.01)
*B60W 10/115* (2012.01)
(Continued)

(52) U.S. Cl.
CPC ........... *F16H 61/686* (2013.01); *B60W 10/02* (2013.01); *B60W 10/115* (2013.01);
(Continued)

(58) Field of Classification Search
CPC ................. F16H 61/686; F16H 61/061; F16H 2061/0462; F16H 2061/064
See application file for complete search history.

(56) References Cited

U.S. PATENT DOCUMENTS 4,679,674 A 7/1987 Sakakiyama
4,757,886 A * 7/1988 Brown .................. B60W 30/18
192/103 F
(Continued)

OTHER PUBLICATIONS

Prosecution History from U.S. Appl. No. 13/909,679, dated Oct. 2, 2014 through Apr. 3, 2015, 73 pp.

*Primary Examiner* — Huan Le
(74) *Attorney, Agent, or Firm* — Shumaker & Sieffert, P.A.

(57) ABSTRACT

An automatic transmission for a vehicle drivetrain includes a transmission housing, an input shaft, an output shaft, and a plurality of gears within the transmission housing. The plurality of gears defines multiple mechanical gear ratios between the input shaft and the output shaft. The transmission further includes a plurality of clutches operable to selectively engage the multiple mechanical gear ratios, and a plurality of rotational speed sensors. Each rotational speed sensor is operable to measure rotational speeds relative to the transmission housing for of one of the input shaft, the output shaft, or one of the plurality of gears. The transmission further includes a transmission control system configured to receive signals representing the measured rotational speeds from the plurality of rotational speed sensors and control the plurality of clutches to change between gear ratios based at least in part on the signals representing the measured rotational speeds.

20 Claims, 6 Drawing Sheets

(51) Int. Cl.
*B60W 50/02* (2012.01)
*F16H 59/40* (2006.01)
*F16H 59/42* (2006.01)
*F16H 61/06* (2006.01)
*F16H 59/38* (2006.01)
*F16H 61/18* (2006.01)
*F16H 61/00* (2006.01)
*F16H 61/04* (2006.01)
*F16H 59/36* (2006.01)
*F16H 61/684* (2006.01)

(52) U.S. Cl.
CPC ......... *B60W 50/0205* (2013.01); *F16H 59/38* (2013.01); *F16H 59/40* (2013.01); *F16H 59/42* (2013.01); *F16H 61/061* (2013.01); *F16H 61/18* (2013.01); *F16H 61/68* (2013.01); *B60W 2510/025* (2013.01); *B60W 2510/0241* (2013.01); *F16H 59/36* (2013.01); *F16H 61/684* (2013.01); *F16H 2061/0078* (2013.01); *F16H 2061/0462* (2013.01); *F16H 2061/064* (2013.01)

(56) References Cited

U.S. PATENT DOCUMENTS

| | | |
|---|---|---|
| 4,846,321 A | 7/1989 | Ohkumo |
| 4,849,899 A | 7/1989 | Cote et al. |
| 6,022,293 A | 2/2000 | Dourra et al. |
| 6,253,140 B1 | 6/2001 | Jain et al. |
| 6,961,646 B2 | 11/2005 | Soliman et al. |
| 7,059,304 B2 | 6/2006 | Manzone et al. |
| 7,216,025 B2 | 5/2007 | Keyse et al. |
| 7,848,126 B2 | 12/2010 | Hartlieb et al. |
| 8,335,624 B2 | 12/2012 | Suzuki et al. |
| 8,342,998 B2 | 1/2013 | Fujii et al. |
| 9,097,345 B2 * | 8/2015 | Funyak ............. B60W 50/0205 |
| 2008/0242505 A1 | 10/2008 | Kitamura et al. |
| 2009/0112429 A1 | 4/2009 | Sah et al. |
| 2009/0118049 A1 * | 5/2009 | Lee ...................... F16H 61/061 475/117 |
| 2013/0088264 A1 | 4/2013 | Barrenscheen et al. |
| 2014/0358390 A1 | 12/2014 | Funyak et al. |

* cited by examiner

DIRECT CLUTCH SLIP CONTROL

This application is a continuation application of U.S. patent application Ser. No. 13/909,679, filed on Jun. 4, 2013, the entire contents of which are incorporated by reference.

TECHNICAL FIELD

The invention relates to controlling clutches, and more particularly, but without limitation to controlling clutches within vehicle transmissions.

BACKGROUND

Automatic vehicle transmissions generally include a number of clutches that are selectively engaged by a transmission control system in order to select a gear ratio for the transmission. Often, the clutches are hydraulically controlled. In some examples, the components of a hydraulically controlled clutch include an electric solenoid driver, a clutch solenoid and the clutch itself. In order to control a clutch, the electric solenoid driver delivers an electrical signal to activate the clutch solenoid, which, in turn, controls hydraulic fluid pressure in order to control the clutch. In this manner, electrical control signals from the electric solenoid driver are used to engage and disengage hydraulically controlled clutches within an automatic transmission. By selectively engaging different clutches or combination of clutches within the automatic transmission, the transmission control system selects a gear ratio for the transmission.

To avoid damage to the gearing of an automatic transmission, it is important not to engage gears for more than one gear ratio of an automatic transmission at a time. For this reason, automatic transmission control programs generally include a short time delay between the disengagement of one gear ratio and the engagement of another gear ratio. Furthermore, the physical components of hydraulically controlled clutches may respond differently as they wear over time and/or in different environmental conditions, such as varying temperatures. For this reason, transmission control programs may attempt to account for these variations by adjusting control parameters to account for varying environmental conditions and/or transmission wear over time.

SUMMARY

In general, this disclosure is directed toward automatic transmissions and techniques for controlling automatic transmissions. In some examples, control signals for controlling clutches to select different gear ratios within an automatic transmission may be based at least in part on measured rotational speeds of gearing engaged by the clutches within the transmission. In this manner, the control signals may directly respond to clutch engagement and disengagement rather than attempting to account for varying environmental conditions and/or transmission wear over time.

In one example, this disclosure is directed to an automatic transmission for a vehicle drivetrain comprising a transmission housing, an input shaft, an output shaft, and a plurality of gears within the transmission housing. The plurality of gears define multiple mechanical gear ratios between the input shaft and the output shaft. The transmission further comprises a plurality of clutches operable to selectively engage the multiple mechanical gear ratios, and a plurality of rotational speed sensors. Each rotational speed sensor is operable to measure rotational speeds relative to the transmission housing for of one of the input shaft, the output shaft, or one of the plurality of gears. The transmission further comprises a transmission control system configured to receive signals representing the measured rotational speeds from the plurality of rotational speed sensors and control the plurality of clutches to change between gear ratios of the multiple mechanical gear ratios based at least in part on the signals representing the measured rotational speeds.

In another example, this disclosure is directed to a method of controlling an automatic transmission for a vehicle drivetrain, the method comprising of receiving signals representing measured rotational speeds from a plurality of rotational speed sensors, each rotational speed sensor being operable to measure rotational speeds relative to a transmission housing of the automatic transmission for of one of: an input shaft of the automatic transmission, an output shaft of the automatic transmission, or one of a plurality of gears of the automatic transmission, the plurality of gears defining multiple mechanical gear ratios between the input shaft and the output shaft. The method further comprises controlling a plurality of clutches operable to selectively engage the multiple mechanical gear ratios to change between gear ratios of the multiple mechanical gear ratios based at least in part on the signals representing the measured rotational speeds.

In a further example, this disclosure is directed to a computer-readable storage medium that stores computer-executable instructions that, when executed, configure a control system for an automatic transmission to receive signals representing measured rotational speeds from a plurality of rotational speed sensors, each rotational speed sensor being operable to measure rotational speeds relative to a transmission housing of the automatic transmission for of one of: an input shaft of the automatic transmission, an output shaft of the automatic transmission, or one of a plurality of gears of the automatic transmission, the plurality of gears defining multiple mechanical gear ratios between the input shaft and the output shaft. The computer-executable instructions that, when executed, further configure the control system to control a plurality of clutches operable to selectively engage the multiple mechanical gear ratios to change between gear ratios of the multiple mechanical gear ratios based at least in part on the signals representing the measured rotational speeds.

The details of one or more examples are set forth in the accompanying drawings and the description below. Other features, objects, and advantages of this disclosure will be apparent from the description and the figures, and from the claims.

DETAILED DESCRIPTION

Figure 1:
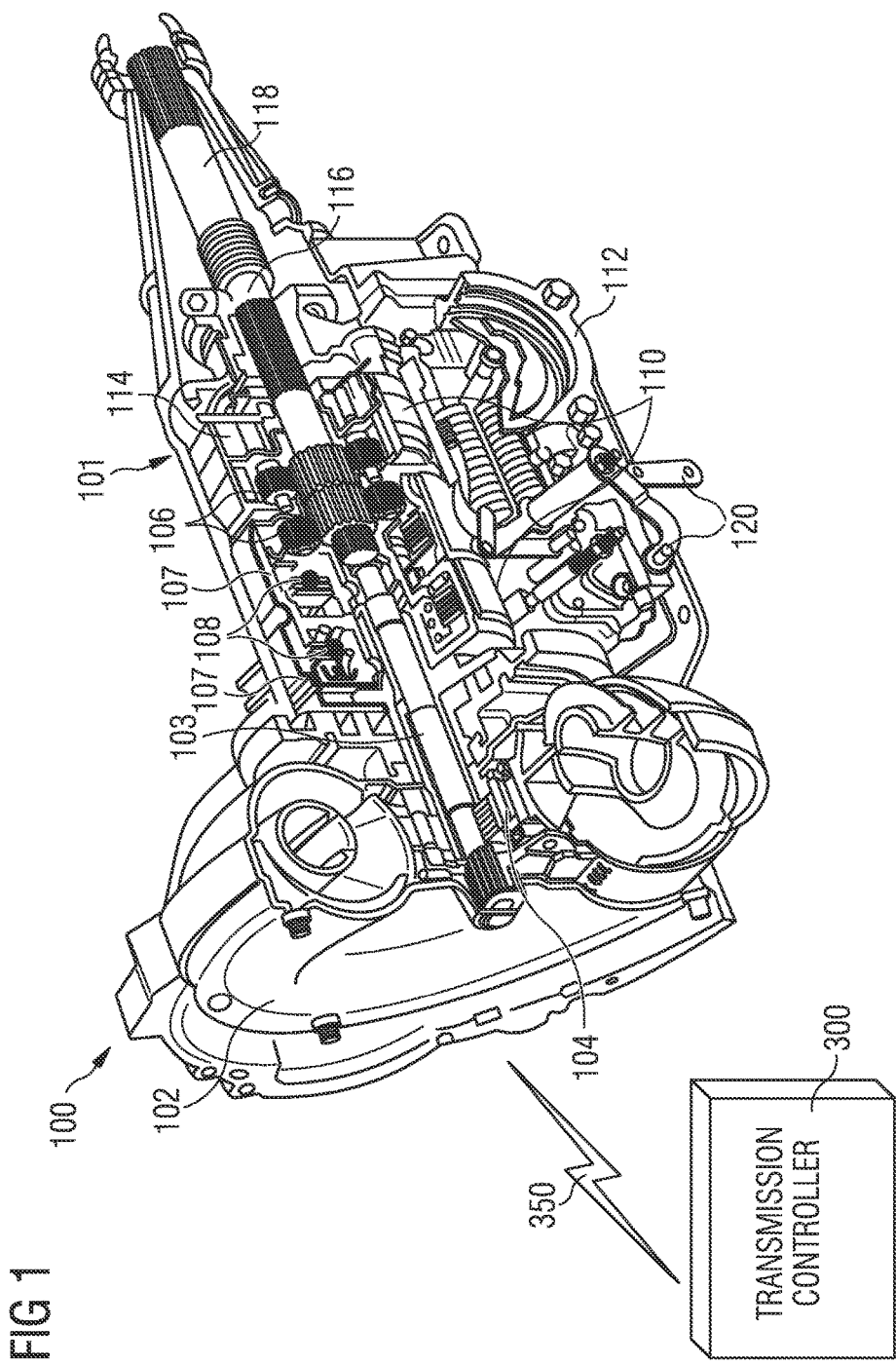
FIG. 1 is a cut-away illustration of automatic transmission including rotary speed sensors configured to sense rotation of gears within the automatic transmission.

In general, this disclosure is directed toward automatic transmissions and techniques for controlling automatic transmissions. In one example, control signals for controlling clutches to select different gear ratios within an automatic transmission may be based at least in part on the signals representing measured rotational speeds of gearing within the transmission. In this manner, the control signals may directly respond to clutch engagement and disengagement rather than attempting to account for varying environmental conditions and/or transmission wear over time.

In one aspect, the control of clutches within an automatic transmission may be considered to represent closed loop control techniques in that feedback from sensors within the transmission may be used to adjust control signals for transmission clutches. In contrast to transmissions that do not include feedback signals, may generally be considered to operate using open loop control techniques. In some examples, open loop techniques may attempt to account for varying environmental conditions and/or transmission wear over time. Techniques disclosed herein may provide one or more advantages. As one example, the techniques disclosed herein may allow for precise control of the engagements and disengagement of clutches within a transmission. Because the techniques disclosed herein may facilitate direct sensing and control of the operation of clutches within a transmission, the clutches may be controlled without needing to directly account for varying environmental conditions and/or transmission wear over time. Transmission wear that may affect shifting may include, for example, wear of clutch plates, change in friction of clutch plates, contamination and/or degradation of the hydraulic oil, change in oil viscosity, solenoid wear or variation, and/or electronic control signal system variations. To the extent that the effects of varying environmental conditions and/or transmission wear over time may be unpredictable, direct sensing and control of the operation of clutches within a transmission may provide increased precision control of the engagements and disengagement of clutches within a transmission.

As another example, in contrast to open loop control system, the precision of the components may be less stringent with a transmission using a control loop control system because the precise response of the components to control signal does not need to be predetermined. This may allow use of less expensive components within the transmission. In addition, for some open loop control systems, individual components may be calibrated as part of the manufacturing process, including, for example, calibrating hydraulic solenoids. With the closed loop control techniques, such calibrations may be unnecessary, which may reduce manufacturing costs associated with an automatic transmission.

As another example, increasing prices of oil coupled with governmental requirements for higher vehicle fuel efficiency have led to demand for more efficient powertrains for vehicles. Improving the efficiency of a hydraulically controlled automatic transmission is one way to improve a vehicle's fuel efficiency. The main purpose of a hydraulically controlled automatic transmission is to transfer the energy created by the engine to the wheels of the vehicle. By improving the precision of the operation of clutches within the transmission, more energy can be transferred from the engine to the wheels of the vehicle, e.g., by reducing the lag time between the disengagement of one gear ratio and the engagement of another gear ratio. As another example, by improving the precision of the operation of clutches within the transmission, coordination between the engine power output and the transmission can likewise be improved such that the engine may reduce power output during a gear shift. This may further reduce losses associated with shifting a hydraulically controlled automatic transmission. The better the energy transfer efficiency and the lower the losses, the higher efficiency of the transmission.

As another example, improving the precision of the operation of clutches within a hydraulically controlled automatic transmission can provide smoother shifting, e.g., without jerking passengers around in the cabin of the vehicle. In this manner, the techniques disclosed herein may provide improved ride for passengers of a vehicle.

The aforementioned advantages are merely discussed for illustrative purposes. Each of the aforementioned advantages may or may not present themselves in different examples of this disclosure. In some aspects of this disclosure, one or more of the aforementioned advantages may not be present such that the aforementioned advantages do not represent any characterization of the scope of this disclosure.

FIG. 1 is a cut-away illustration of automatic transmission 100. Automatic transmission 100 is a hydraulically controlled automatic transmission for a vehicle drivetrain. Automatic transmission 100 includes a variety of components common to automatic transmissions, including transmission housing 101, torque converter 102, input shaft 103, shift linkages 120, bands 110, valve body and solenoids 112 and output shaft 118. Automatic transmission 100 further includes planetary gear sets 106, a plurality of gears within transmission housing 101 that define multiple mechanical gear ratios between the input shaft 103 and output shaft 118. Automatic transmission 100 further includes stator over running clutch 104, over running clutch 114 and hydraulically controlled clutches 107 operable to selectively engage the multiple mechanical gear ratios by fixing different ring gears of the planetary gear sets 106 to transmission housing 101.

Rotational speed sensors 108 are positioned adjacent to hydraulically controlled clutches 107. Each rotational speed sensor 108 is operable to measure rotational speeds relative to transmission housing 101 for of one of: input shaft 103, output shaft 118, or one of the planetary gear sets 106. In the same or different examples, speed sensors 108 may include a Hall sensor, a variable reluctance sensor, a giant magneto-resistive sensor or other rotational speed sensor.

Automatic transmission 100 further includes a transmission control system including transmission controller 300. Transmission controller 300 is configured to receive signals representing the measured rotational speeds from speed sensors 108 and control clutches 107 via solenoids 112 to change between gear ratios of planetary gear sets 106 based at least in part on the signals from speed sensors 108, the signals representing measured rotational speeds of gearing of planetary gear sets 106. In some examples, solenoids 112 include hydraulic solenoids configured to activate and deactivate the clutches 107 according to electrical signals from electronic solenoid drivers (not shown in FIG. 1). In such examples, the electronic solenoid drivers receive control signals from controller 300 and deliver the electrical signals to solenoids 112 based on the control signals controller 300.

For simplicity, the signal connections between transmission controller 300, clutches 107 and sensors 108 are generally shown as communications 350 in FIG. 1. However, examples of transmission control systems including transmission controller 300 are discussed in further detail with respect to FIG. 3 and FIG. 4. A wide range of wireless or wire-based communications could be used, such as direct communication between various sensors and transmission controller 300 or signals sent over a controller area network (CAN) bus.

In some examples, transmission controller 300 may control clutches 107 to change between gear ratios of the multiple mechanical gear ratios further based on a rotational speed of input shaft 103 and a rotational speed of output shaft 118. In such examples, transmission controller 300 may determine the rotational speed of input shaft 103 based on engine speed, commonly measured in revolutions per minute (RPM). In addition, transmission controller 300 may determine the rotational speed of output shaft 118 based on vehicle speed as output shaft 118 is directly connected to the wheels of the vehicle, e.g., via a driveshaft and differential of the vehicle.

In order to control a shift between two selectable mechanical gear ratios provided by planetary gear sets 106, controller 300 receives signals representing measure rotational speeds from sensors 108 installed at the input clutch and the output clutch of clutches 107. Controller 300 then determines the speed differential and corresponding slip rate of the input clutch and the output clutch. As mentioned above, controller 300 may control the operation of the clutches 107 further based on additional speed sensor outputs, engine speed and transmission output shaft speed sensors. In some examples, controller 300 controls the operation of the clutches 107 according to a desired shift quality, e.g., using a hard "sporty" shift, a smooth quiet shift or any other desired shift quality. In the same or different examples, controller 300 may control the operation of the clutches 107 to maintain efficient engine speed and/or enhanced vehicle stability.

Controller 300 directly monitors and adjusts differences in rotational speed of the input clutch and the output clutch during the engagement/disengagement of a shift according to preprogrammed clutch slip rates defined according to a transmission control program. By determining the rotational speed differential between the clutches controller may make adjustments to control signals in order to maintain a desired and coordinated engagement/disengagement status for the input clutch and the output clutch. As one example, controller 300 may operate a control program for the input clutch and the output clutch as disclosed in U.S. Pat. No. 7,848,126 to Hartlieb et al., the entire content of which is incorporated by reference herein.

Figure 3:
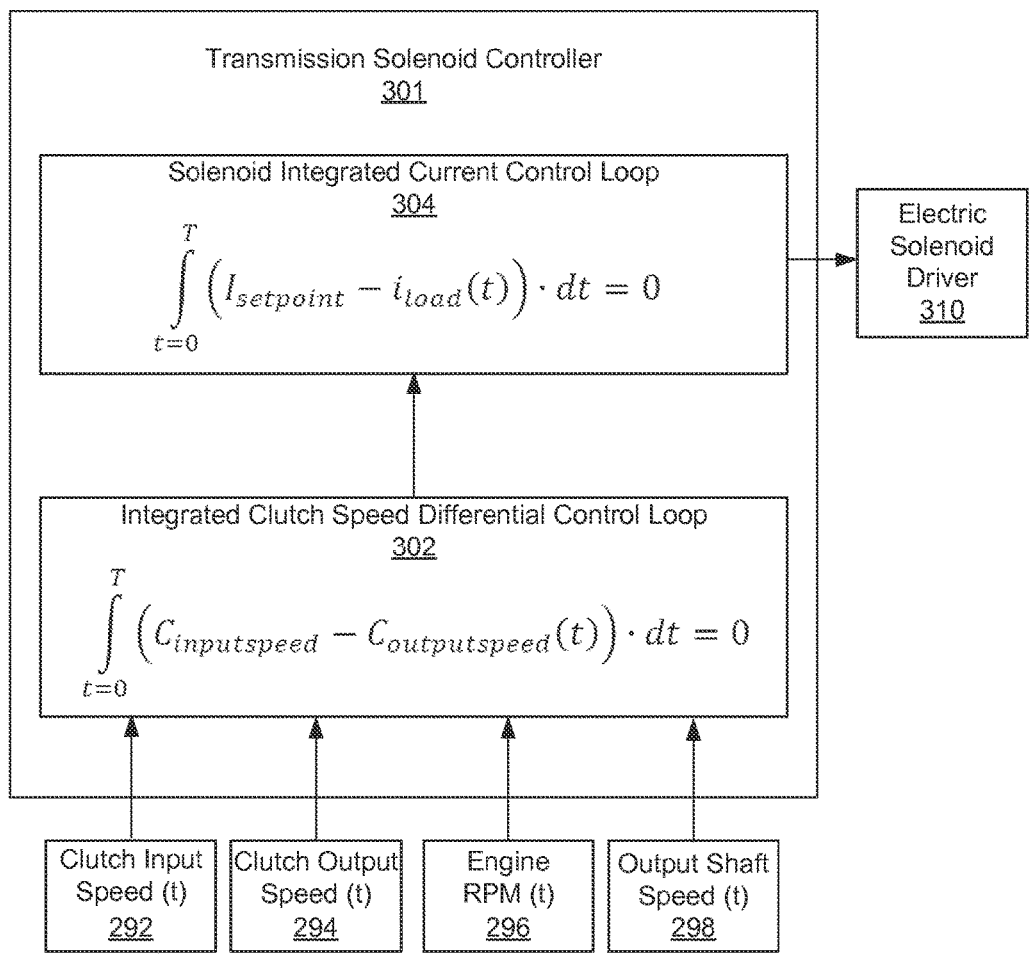
FIG. 3 is a conceptual illustration of a transmission control system including example mathematically representations of an inner control loop and an outer control loop for controlling clutch engagement and disengagement within an automatic transmission.

In one example, the transmission control system including controller 300 may encompass two control loops as shown in FIG. 3. The inner control loop may monitor the speed differential between the input clutch and the output clutch based on the data supplied by sensors 108, which are installed near clutches 107. The outer control loop is responsible for delivering current to the corresponding solenoid 112 to control the oil pressure used to engage or disengage clutches 107. The Inner control loop may generally be considered faster than the outer control loop as the operation of the inner control loop merely represents electrical control signals and a digital control program. The inner control loop calculates the speed differential between the input clutch and the output clutch then compares the actual speed differential between the clutches to the expected speed differential, which is part of the transfer function entered into the control system for shift control. The inner control loop then sends an adjustment signal to the outer control loop. Depending on the type of solenoid, an increase in current will increase oil pressure thus pressing the corresponding clutches 107 closer together to reduce the amount of slip between the clutches. Likewise, a decrease in current reduces the oil pressure causing the corresponding clutches 107 to separate further increasing the amount of slip between the clutches.

Because of the fast acting nature of the algorithms employed by controller 300, the transmission control system may further adjust for unexpected deviations in the engine RPM thus eliminating or greatly reducing noticeable loading effects on the engine. Thus, the engine speed may be kept in a RPM range for improved fuel efficiency. In addition, the transmission control system may monitor and adjust for unexpected speed deviations in the output shaft of the transmission. For example, an unexpected increase in the speed of output shaft may be caused by an icy road. In this manner, the transmission control system may be used to improve vehicle stability control as well.

As discussed above, transmission control system in accordance with this disclosure may improve the energy transfer efficiency of an automatic transmission. Automatic transmission designs are commonly including more and more gears to provide additional gear ratios. This allows an engine of a vehicle to operate in its most efficient state over more traveling conditions, such as varying speeds and loads. However, adding more gears to an automatic transmission also adds to the complexity of the electronics necessary to control the transmission. While the example automatic transmission 100 only illustrates two sensors 108, as the number of gears increases in an automatic transmission, additional sensors 108 may be included to monitor each of the clutches associated with the gears within the transmission.

Figure 2:
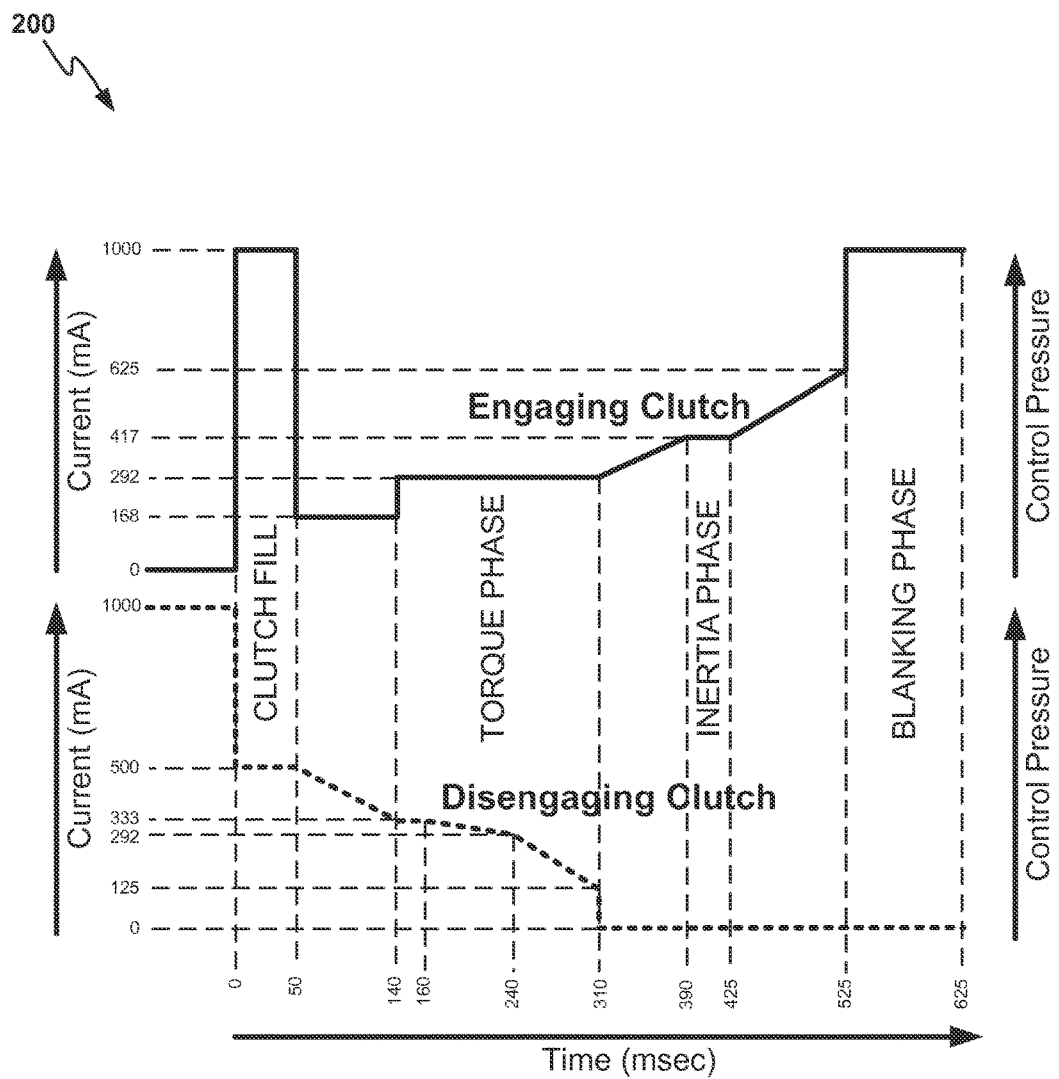
FIG. 2 illustrates an example transmission clutch engaging and disengaging pattern that may be employed by a transmission control system to change between mechanical gear ratios of an automatic transmission.

FIG. 2 illustrates an example transmission clutch engaging and disengaging pattern 200 that may be employed by a transmission control system to change between mechanical gear ratios of an automatic transmission. As discussed above, the purpose of transmission control system is to control mechanical changes taking place within the transmission to shift from one gear ratio to another. Generally, is it to smoothly transfer the energy created by the engine to the wheels. However, changing of gears, or shifting, interrupts the transfer of energy from the engine of a vehicle to the wheels of the vehicle. By coordinating the engagement and disengagement of clutches smoothly and quickly, energy loss in the shift or transfer from one gear to another may be limited.

Transmission clutch engaging and disengaging pattern 200 represents one example, coordinated engagement and disengagement of clutches associated with a gear shift according to preprogrammed clutch slip rates defined according to a transmission control program of a transmission control system.

Figure 4:
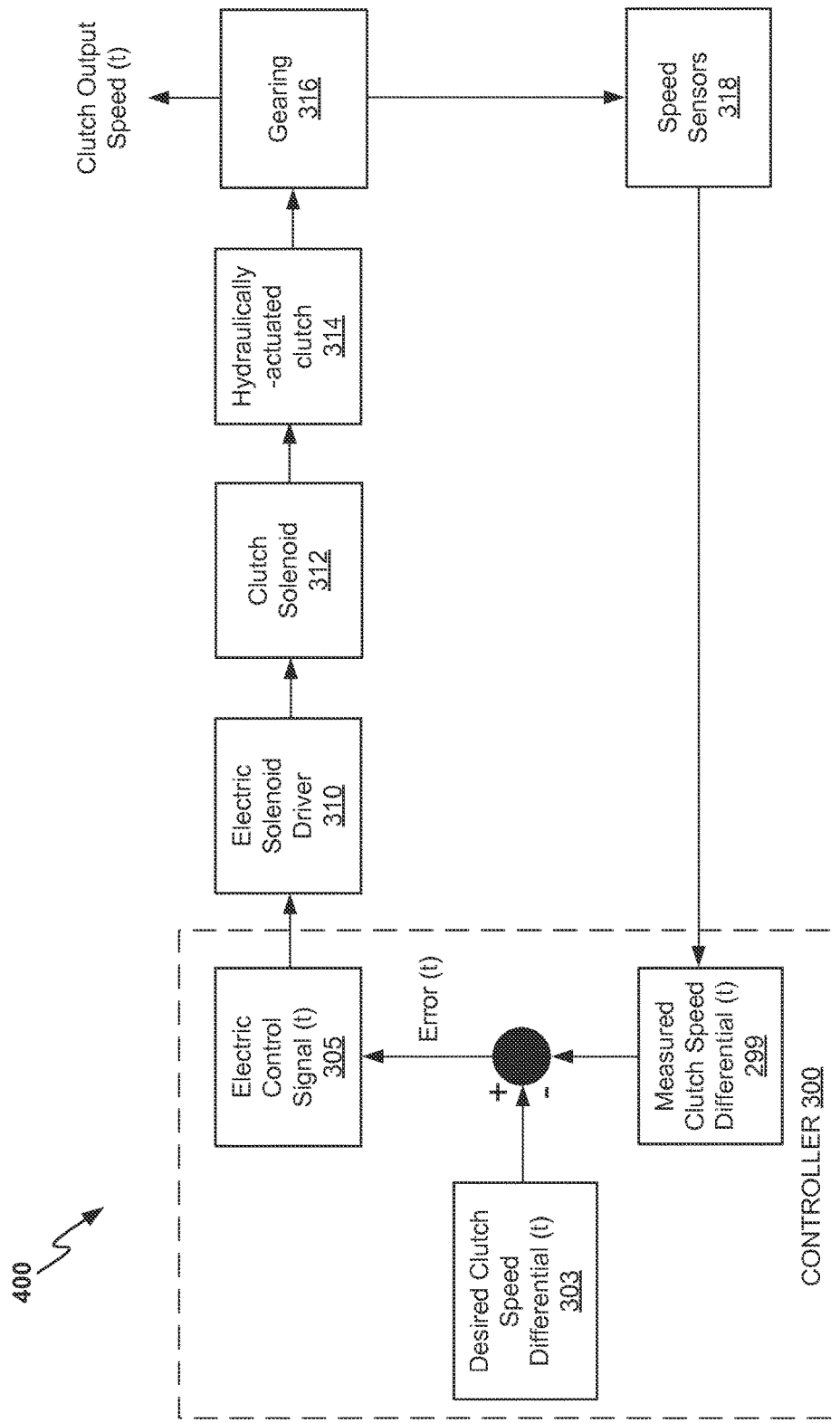
FIG. 4 is a conceptual illustration of a transmission control system providing closed loop control, with signals representing measured rotational speeds of gearing within the automatic transmission providing a feedback signal for the closed loop control.

In transmission clutch engaging and disengaging pattern 200, the upper line is the resulting oil pressure response of the engaging clutch solenoid for the current delivered by a solenoid driver, such as solenoid driver 310 (FIG. 4). The bottom line represents the resulting oil pressure for the disengaging clutch solenoid for the current delivered by the solenoid driver. During the torque phase and the inertia phase of transmission clutch engaging and disengaging pattern 200 accurate clutch control facilitates a smooth and efficient shift occurs. Generally, a solenoid driver should deliver a current accuracy with a ninety-nine percent precision. Using a transmission control system that directly monitors the differential speed or slip between input and output clutches may facilitate accurate and controlled shifts in the torque phase and the inertia phase of transmission clutch engaging and disengaging pattern 200.

FIG. 3 is a conceptual illustration of a transmission control system including transmission solenoid controller 301. Transmission solenoid controller 301 may be considered a component of transmission controller 300, and is associated with the control of one or more clutches 107 (FIG. 1). Transmission solenoid controller 301 includes example mathematical representations of an inner control loop and an outer control loop for controlling clutch engagement and disengagement within an automatic transmission.

Transmission solenoid controller 301 is represented mathematically with an inner control loop by Integrated Clutch Speed Differential Control Loop 302 and an outer control loop by Solenoid Integrated Current Control Loop 304. The inner control loop calculates a difference between an actual clutch slip rate based on the signals representing the measured rotational speeds and a preprogrammed clutch slip rate defined by a transmission control program and sends an adjustment signal based on the difference to the outer control loop. In turn, the outer control loop receives the adjustment signal from the inner control loop and sends one or more of the control signals to electronic solenoid driver 310 to adjust hydraulic pressure with a corresponding one of the one or more hydraulic solenoids. The hydraulic pressure operates to activate and deactivate a corresponding one of the plurality of hydraulically-actuated clutches.

The inner control loop converts the input signals 292, 294 from speed sensors located at the input and output clutches as well as the engine RPM and transmission output shaft to provide an "adjustment" signal for the slower outer control loop. The inner control loop determines if there is an error in what the predetermined speed differential should be between the input and output clutches and sends an adjustment signal to the outer control loop to adjust the current used to drive the solenoid controlling the hydraulic oil pressure to the clutches.

Because the inner loop checks the error against a predetermined speed differential, compensation for variables such as clutch wear, solenoid variations, temperature variations, hydraulic oil variation and all other variable parameters that affect the shift quality and efficiency of transferring the energy created by the engine to the wheels of the vehicle are limited.

In some examples, transmission solenoid controller 301 may monitor other inputs such as engine RPM 296 and transmission output shaft speed 298. Combining these inputs in the decision making process for the adjustments signaled by the inner control loop may improve fuel efficiency by providing a capability to adjust for unexpected engine speed sag as well as speed deviations in the output shaft of the transmission.

FIG. 4 is a conceptual illustration of a transmission control system 400 providing closed loop control, with signals representing measured rotational speeds of gearing within the automatic transmission providing a feedback signal for the closed loop control.

Transmission control system 400 includes controller 300 which includes a predetermined desired speed differential 303 over time t for input and output clutches during a gear shift. Controller further measures an actual clutch speed differential 299 over time t based on signals from speed sensors 318. In some examples, speed sensors 318 may be functionally the same as speed sensors 108 (FIG. 1). Controller 300 calculates an error between the actual clutch speed differential 299 and the desired speed differential 303 and issues electronic control signals 305 based on the error. In different examples, controller 300 may use a Proportional Integral Derivative (PID), Proportional Integral (PI) or other closed loop control methodology to calculate electronic control signals 305 based on the error.

Controller 300 sends electronic control signals 305 to electronic solenoid driver 310. In turn, electronic solenoid driver 310 receives the control signals from controller 300 and delivers electrical signals to hydraulic clutch solenoid 312 based on control signals 305 from controller 300. Clutch solenoid 312 operates to activate and/or deactivate hydraulically-actuated clutch 314 by changing pressure within the hydraulic system according to electrical signals from electronic solenoid driver 310.

In this manner, within transmission control system 400 electronic control signals 305 represent an input signal for the closed loop control system whereas the signals representing the measured rotational speeds from speed sensors 318 represent feedback signals for the closed loop.

Figure 5:
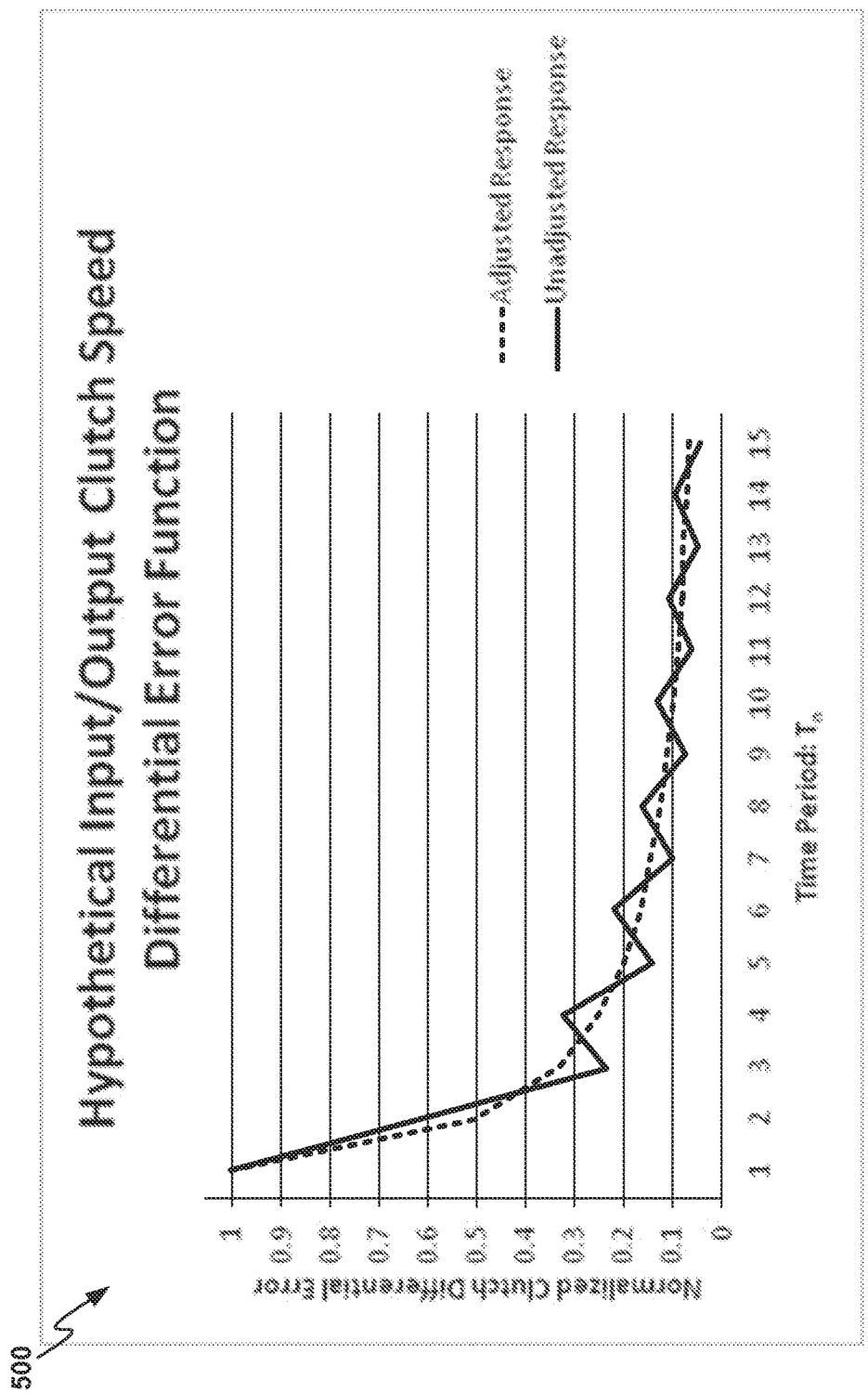
FIG. 5 is a graph illustrating the potential effect of the inner control loop of FIG. 3 on controlling clutch engagement and disengagement.

FIG. 5 is a graph 500 illustrating the potential effect of the inner control loop of FIG. 3 on controlling clutch engagement and disengagement. In particular, FIG. 5 represents a logistic map for an inner control loop to determine the speed error between the input and output clutches. If a transfer curve is to be partitioned into many time periods where $T_0$ is the initial or start of the engagement/disengagement of the shift sequence and $T_n$ (where n is determined to be the end time period point) and is entered into a logistic map. The control loop operates to check the actual speed error between the two clutches to what is expected to be the error of speed differential of the two clutches at each time period, $T_0$ to $T_n$. At each time period, a signal is sent to the outer control loop to adjust the current drive to the solenoid to bring the speed differential between the two clutches back to the expected value. In this manner, the control signals can instead be adjusted in real time or approximately real time according to a closed loop control methodology as represented by the adjusted response to provide a smoother or desired control of clutch speed differential.

For example, the unadjusted response is the speed differential between the clutches with no interaction by the inner control loop of transmission controller 300 at the given time periods $T_1$ through $T_n$. The adjusted response is the expected resulting speed differential between the clutches with appropriate adjustments made to the solenoid drive current by the transmission controller 300 at the respective time periods.

Figure 6:
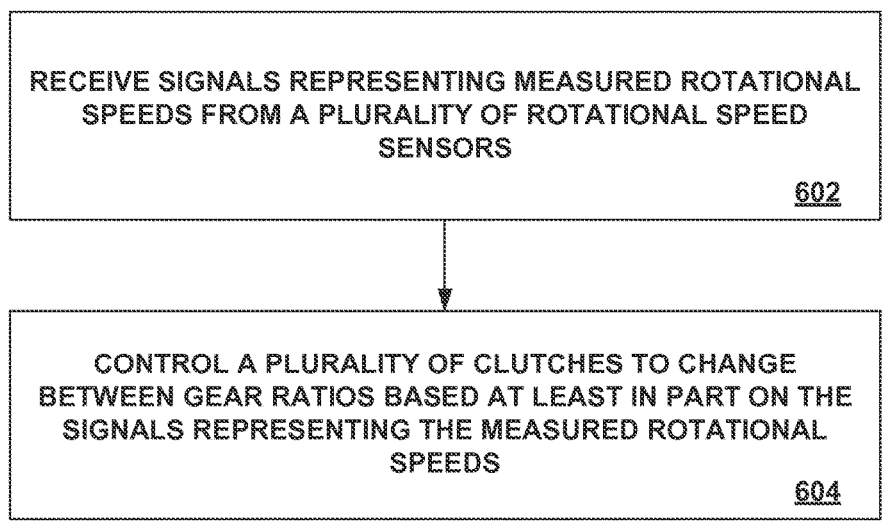
FIG. 6 is a flowchart illustrating example techniques for controlling an automatic transmission for a vehicle drivetrain.

FIG. 6 is a flowchart illustrating example techniques for controlling an automatic transmission for a vehicle drivetrain. For clarity, the techniques illustrated in FIG. 6 are described with reference to transmission control system 400 of FIG. 4.

In step 602, transmission controller 300 receives signals representing measured rotational speeds from rotational speed sensors 318. Each rotational speed sensor 318 is operable to measure rotational speeds relative to a transmission housing of the automatic transmission for of one of: an input shaft of the automatic transmission, an output shaft of the automatic transmission, or one of a plurality of gears of the automatic transmission, the plurality of gears defining multiple mechanical gear ratios between the input shaft and the output shaft.

In step 604, transmission controller 300 controls a plurality of clutches operable to selectively engage the multiple mechanical gear ratios to change between gear ratios of the multiple mechanical gear ratios based at least in part on the signals representing the measured rotational speeds. In particular, transmission controlled calculates an error between the actual clutch speed differential 299 and the desired speed differential 303 and issues electronic control signals 305 based on the error.

In some examples, controlling the plurality of clutches to change between gear ratios of the multiple mechanical gear ratios based at least in part on the signals representing the measured rotational speeds may include controlling the plurality of clutches to change between gear ratios of the multiple mechanical gear ratios according to preprogrammed clutch slip rates.

In the same or different examples, controlling the plurality of clutches to change between gear ratios of the multiple mechanical gear ratios is further based on a rotational speed of the input shaft and a rotational speed of the output shaft.

In the same or different examples, controlling the plurality of clutches to change between gear ratios of the multiple mechanical gear ratios may include sending control signals to one or more electronic solenoid drivers of the automatic transmission, the solenoid drivers being configured to deliver, based on the control signals, electrical signals to one or more hydraulic solenoids of the automatic transmission.

In the same or different examples, controlling the plurality of clutches to change between gear ratios of the multiple mechanical gear ratios based at least in part on the signals representing the measured rotational speeds may include controlling the plurality of clutches using inner control loops and outer control loops. In such examples, for each inner control loop, controlling the plurality of clutches using the inner control loops may include calculating a difference between an actual clutch slip rate based on the signals representing the measured rotational speeds and a preprogrammed clutch slip rate, and sending an adjustment signal based on the difference to a corresponding outer control loop. Further, in such examples, for each corresponding outer control loop, controlling the plurality of clutches using the outer control loop may include receiving the adjustment signal from the corresponding inner control loop and sending one or more of the control signals to one or more of the electronic solenoid drivers, the electronic solenoid drivers being configured to adjust hydraulic pressure with a corresponding one of the one or more hydraulic solenoids, wherein the hydraulic pressure operates to activate and deactivate a corresponding one of the plurality of hydraulically-actuated clutches.

In the same or different examples, controlling the plurality of clutches to change between gear ratios of the multiple mechanical gear ratios based at least in part on the signals representing the measured rotational speeds may include controlling the plurality of clutches using closed loops. For each closed loop, the control signals may represent an input signal for the closed loop, and the signals representing the measured rotational speeds may represent a feedback signal for the closed loop.

The techniques described in this disclosure may be implemented, at least in part, in hardware, software, firmware, or any combination thereof. For example, various aspects of the described techniques, including the disclosed transmission control systems, may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

The term "control system" or "controller" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a transitory or non-transitory computer-readable storage medium, containing instructions. Instructions embedded or encoded in a computer-readable medium, including a computer-readable storage medium, may cause one or more programmable processors, or other processors, such one or more processors included in a control system, to implement one or more of the techniques described herein, such as when instructions included or encoded in the computer-readable medium are executed by the one or more processors. Non-transitory computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer-readable media. In some examples, an article of manufacture may comprise one or more computer-readable storage media.

Various examples of this disclosure have been described. Modification of the described examples may be made within the spirit of this disclosure. As one example, as described herein, closed loop control feedback signals are based on rotational speed sensor measurements. However, in other examples, closed loop control feedback signals may be instead based on actual hydraulic oil pressure, the pressure acting on the hydraulically actuated clutch to engage and/or disengage the clutch. In such an example, a pressure sensor may be included in each solenoid and the sensed pressures would be mapped to the resulting clutch engagement and/or disengagement characteristics. These and other examples are within the scope of the following claims.

What is claimed is:

1. An automatic transmission for a vehicle drivetrain comprising:
    a transmission housing;
    an input shaft;
    an output shaft;
    a plurality of gear sets within the transmission housing, the plurality of gear sets defining multiple mechanical gear ratios between the input shaft and the output shaft;
    a plurality of clutches operable to selectively engage gears among the plurality of gear sets to establish the multiple mechanical gear ratios;
    a plurality of rotational speed sensors, each rotational speed sensor being operable to measure rotational speeds relative to the transmission housing for one of the gears among the plurality of gear sets; and a transmission control system configured to:
receive signals representing the measured rotational speeds from the plurality of rotational speed sensors and control the plurality of clutches to change between gear ratios of the multiple mechanical gear ratios based at least in part on the signals representing the measured rotational speeds, and control, via control signals, the plurality of clutches using closed loops, wherein the control signals represent an input signal for each closed loop, and wherein the signals representing the measured rotational speeds represent a feedback signal for each closed loop.

2. The automatic transmission of claim 1, wherein the plurality of clutches include hydraulically-actuated clutches, the automatic transmission further comprising:
one or more hydraulic solenoids configured to activate and deactivate the plurality of hydraulically-actuated clutches according to electrical signals; and
one or more electronic solenoid drivers configured to receive the control signals from the transmission control system and deliver the electrical signals to the one or more hydraulic solenoids based on the control signals from the transmission control system.

3. The automatic transmission of claim 1, wherein the transmission control system is further configured to control the plurality of clutches to change between gear ratios of the multiple mechanical gear ratios according to preprogrammed clutch slip rates defined according to a transmission control program.

4. The automatic transmission of claim 1, wherein the transmission control system is further configured to control the plurality of clutches to change between gear ratios of the multiple mechanical gear ratios further based on a rotational speed of the input shaft and a rotational speed of the output shaft.

5. The automatic transmission of claim 1,
wherein the plurality of clutches includes hydraulically-actuated clutches,
wherein the transmission control system is further configured to control the plurality of clutches using inner control loops and outer control loops,
wherein, for each inner control loop, the inner control loop calculates a difference between an actual clutch slip rate based on the signals representing the measured rotational speeds and a preprogrammed clutch slip rate defined by a transmission control program and sends an adjustment signal based on the difference to a corresponding outer control loop,
wherein the corresponding outer control loop receives the adjustment signal from the inner control loop and sends one or more of the control signals to one or more of the electronic solenoid drivers to adjust hydraulic pressure with a corresponding one of one or more hydraulic solenoids, wherein the hydraulic pressure operates to activate and deactivate a corresponding one of the plurality of hydraulically-actuated clutches.

6. The automatic transmission of claim 1, wherein the plurality of rotational speed sensors include at least one of a group consisting of:
a Hall sensor;
a variable reluctance sensor; and
a giant magneto-resistive sensor.

7. The automatic transmission of claim 1,
wherein the plurality of gear sets comprises a plurality of planetary gear sets defining the multiple mechanical gear ratios between the input shaft and the output shaft,
wherein the plurality of clutches are operable to selectively engage gears among the plurality of planetary gear sets to establish the multiple mechanical gear ratios, and
wherein each rotational speed sensor of the plurality of rotational speed sensors is operable to measure the rotational speeds relative to the transmisson housing for one of the gears among the plurality of planetary gear sets.

8. A method of controlling an automatic transmission for a vehicle drivetrain, the method comprising:
receiving signals representing measured rotational speeds from a plurality of rotational speed sensors, each rotational speed sensor being operable to measure the rotational speeds relative to a transmission housing of the automatic transmission for one of a plurality of gear sets of the automatic transmission, the plurality of gear sets defining multiple mechanical gear ratios between the input shaft and the output shaft; and
controlling, via control signals, a plurality of clutches operable to selectively engage gears among the plurality of gear sets using closed loops to change between gear ratios of the multiple mechanical gear ratios based at least in part on the signals representing the measured rotational speeds,
wherein the control signals represent an input signal for each closed loop, and
wherein the signals representing the measured rotational speeds represent a feedback signal for each closed loop.

9. The method of claim 8,
wherein the plurality of clutches include hydraulically-actuated clutches, and
wherein controlling the plurality of clutches to change between gear ratios of the multiple mechanical gear ratios comprises sending the control signals to one or more electronic solenoid drivers of the automatic transmission, the solenoid drivers being configured to deliver, based on the control signals, electrical signals to one or more hydraulic solenoids of the automatic transmission, the hydraulic solenoids being configured to activate and deactivate the plurality of hydraulically-actuated clutches according to the electrical signals.

10. The method of claim 8, wherein controlling the plurality of clutches to change between gear ratios of the multiple mechanical gear ratios based at least in part on the signals representing the measured rotational speeds comprises controlling the plurality of clutches to change between gear ratios of the multiple mechanical gear ratios according to preprogrammed clutch slip rates.

11. The method of claim 8, wherein controlling the plurality of clutches to change between gear ratios of the multiple mechanical gear ratios is further based on a rotational speed of the input shaft and a rotational speed of the output shaft.

12. The method of claim 8,
wherein controlling the plurality of clutches to change between gear ratios of the multiple mechanical gear ratios based at least in part on the signals representing the measured rotational speeds comprises controlling the plurality of clutches using inner control loops and outer control loops,
wherein, for each inner control loop, controlling the plurality of clutches using the inner control loops comprises calculating a difference between an actual clutch slip rate based on the signals representing the measured rotational speeds and a preprogrammed clutch slip rate, and sending an adjustment signal based on the difference to a corresponding outer control loop, wherein, for each corresponding outer control loop, controlling the plurality of clutches using the outer control loop comprises receiving the adjustment signal from the corresponding inner control loop and sending one or more of the control signals to one or more electronic solenoid drivers, the electronic solenoid drivers being configured to adjust hydraulic pressure with a corresponding one of one or more hydraulic solenoids, wherein the hydraulic pressure operates to activate and deactivate a corresponding one of a plurality of hydraulically-actuated clutches.

13. The method of claim 8, wherein the signals representing the measured rotational speeds include signals from at least one of a group consisting of:
a Hall sensor;
a variable reluctance sensor; and
a giant magneto-resistive sensor.

14. A non-transitory computer-readable storage medium that stores computer-executable instructions that, when executed, configure a control system for an automatic transmission to:
receive signals representing measured rotational speeds from a plurality of rotational speed sensors, each rotational speed sensor being operable to measure the rotational speeds relative to a transmission housing of the automatic transmission for one of a plurality of gear sets of the automatic transmission, the plurality of gear sets defining multiple mechanical gear ratios between the input shaft and the output shaft; and
control, via control signals, a plurality of clutches operable to selectively engage gears among the plurality of gear sets using closed loops to change between gear ratios of the multiple mechanical gear ratios based at least in part on the signals representing the measured rotational speeds,
wherein the control signals represent an input signal for each closed loop, and
wherein the signals representing the measured rotational speeds represent a feedback signal for each closed loop.

15. The non-transitory computer-readable storage medium of claim 14,
wherein the plurality of clutches include hydraulically-actuated clutches, and
wherein controlling the plurality of clutches to change between gear ratios of the multiple mechanical gear ratios comprises sending the control signals to one or more electronic solenoid drivers of the automatic transmission, the solenoid drivers being configured to deliver, based on the control signals, electrical signals to one or more hydraulic solenoids of the automatic transmission, the hydraulic solenoids being configured to activate and deactivate the plurality of hydraulically-actuated clutches according to the electrical signals.

16. The non-transitory computer-readable storage medium of claim 14, wherein controlling the plurality of clutches to change between gear ratios of the multiple mechanical gear ratios based at least in part on the signals representing the measured rotational speeds comprises controlling the plurality of clutches to change between gear ratios of the multiple mechanical gear ratios according to preprogrammed clutch slip rates.

17. The non-transitory computer-readable storage medium of claim 14, wherein controlling the plurality of clutches to change between gear ratios of the multiple mechanical gear ratios is further based on a rotational speed of the input shaft and a rotational speed of the output shaft.

18. The non-transitory computer-readable storage medium of claim 14, wherein controlling the plurality of clutches to change between gear ratios of the multiple mechanical gear ratios based at least in part on the signals representing the measured rotational speeds comprises controlling the plurality of clutches using inner control loops and outer control loops,
wherein, for each inner control loop, controlling the plurality of clutches using the inner control loops comprises calculating a difference between an actual clutch slip rate based on the signals representing the measured rotational speeds and a preprogrammed clutch slip rate, and sending an adjustment signal based on the difference to a corresponding outer control loop,
wherein, for each corresponding outer control loop, controlling the plurality of clutches using the outer control loop comprises receiving the adjustment signal from the corresponding inner control loop and sending one or more of the control signals to one or more electronic solenoid drivers, the electronic solenoid drivers being configured to adjust hydraulic pressure with a corresponding one of one or more hydraulic solenoids, wherein the hydraulic pressure operates to activate and deactivate a corresponding one of a plurality of hydraulically-actuated clutches.

19. The non-transitory computer-readable storage medium of claim 14, wherein the signals representing the measured rotational speeds include signals from at least one of a group consisting of:
a Hall sensor;
a variable reluctance sensor; and
a giant magneto-resistive sensor.

20. The non-transitory computer-readable storage medium od claim 14,
wherein the plurality of gear sets comprises a plurality of planetary gear sets defining the multiple mechanical gear ratios between the input shaft and the output shaft, and
wherein the computer-executable instructions, when executed, configure the control system to control, via the control signals, the plurality of clutches operable to selectively engage gears among the plurality of planetary gear sets using the closed loops to change between the gear ratios of the multiple mechanical gear ratios based at least in part on the signals representing the measured rotational speeds.

* * * * *